(12) United States Patent
Grunditz et al.

(10) Patent No.: US 7,921,647 B2
(45) Date of Patent: Apr. 12, 2011

(54) INTERNAL COMBUSTION ENGINE EXHAUST GAS SYSTEM

(75) Inventors: Daniel Grunditz, Öjersjö (SE); Mikael Larsson, Mölndal (SE); Arne Andersson, Mölnlycke (SE); Lennart Cider, Mölndal (SE); Edward Jobson, Romelanda (SE); Martin Lunden, Mölndal (SE); Peter Josza, Göteborg (SE)

(73) Assignee: Volvo Technology Corp, Gothenburg (SE)

( * ) Notice: Subject to any disclaimer, the term of this patent is extended or adjusted under 35 U.S.C. 154(b) by 678 days.

(21) Appl. No.: 11/571,523

(22) PCT Filed: Jun. 29, 2005

(86) PCT No.: PCT/SE2005/001036
§ 371 (c)(1),
(2), (4) Date: Apr. 3, 2008

(87) PCT Pub. No.: WO2006/004509
PCT Pub. Date: Jan. 12, 2006

(65) Prior Publication Data
US 2009/0113876 A1    May 7, 2009

(30) Foreign Application Priority Data

Jul. 2, 2004  (WO) ................ PCT/SE2004/001093

(51) Int. Cl.
*F02B 33/44*    (2006.01)
*F01N 5/02*     (2006.01)
*F02M 25/07*    (2006.01)
*F02M 25/06*    (2006.01)

(52) U.S. Cl. ............. 60/605.2; 60/278; 60/280; 60/285; 60/230; 123/568.12; 123/568.17

(58) Field of Classification Search ................ 60/605.2, 60/278, 280, 285; 123/568.12, 568.17; *F02M 25/07*
See application file for complete search history.

(56) References Cited

U.S. PATENT DOCUMENTS 1,953,938 A * 4/1934 Jaeger ........................... 423/352

(Continued)

FOREIGN PATENT DOCUMENTS

CN          101099914 A  *  1/2008

(Continued)

OTHER PUBLICATIONS

English Machine Translation of JP 2002-195106 A, published on Jul. 10, 2002.*

(Continued)

*Primary Examiner* — Thai Ba Trieu
(74) *Attorney, Agent, or Firm* — WRB-IP LLP

(57) ABSTRACT

An internal combustion engine exhaust gas system includes an EGR arrangement adapted to lead a first flow of exhaust gas, the EGR flow, from an outlet side of the engine to an inlet side of the engine, an exhaust gas conduit adapted to lead away a second flow of exhaust gas, the exhaust flow, from the outlet side of the engine, and an energy recovering unit, such as a turbo, associated with the exhaust gas conduit. The unit is adapted to recover exhaust gas energy from the exhaust flow. The system includes a heat exchanger adapted to allow heat exchange between at least a part of the EGR flow and at least a part of the exhaust flow, the heat exchanger being associated with the exhaust gas conduit at a position downstream the energy recovering unit.

21 Claims, 1 Drawing Sheet

U.S. PATENT DOCUMENTS

| | | | | |
|---|---|---|---|---|
| 3,800,533 A * | 4/1974 | Zankowski | | 60/278 |
| 4,041,700 A | 8/1977 | Okamoto | | 60/278 |
| 4,147,031 A | 4/1979 | Tanuma et al. | | 60/278 |
| 4,367,719 A | 1/1983 | Kimura et al. | | 123/568.17 |
| 5,005,539 A * | 4/1991 | Kawamura | | 123/21 |
| 5,142,864 A * | 9/1992 | Dunne | | 60/274 |
| 5,205,265 A * | 4/1993 | Kashiyama et al. | | 60/605.2 |
| 5,802,846 A * | 9/1998 | Bailey | | 60/605.2 |
| 5,881,559 A * | 3/1999 | Kawamura | | 60/597 |
| 6,079,373 A * | 6/2000 | Kawamura | | 123/3 |
| 6,119,457 A * | 9/2000 | Kawamura | | 60/618 |
| 6,155,042 A * | 12/2000 | Perset et al. | | 60/278 |
| 6,625,978 B1 * | 9/2003 | Eriksson et al. | | 60/278 |
| 6,705,084 B2 * | 3/2004 | Allen et al. | | 60/608 |
| 6,898,930 B2 * | 5/2005 | Nakatani et al. | | 60/311 |
| 7,165,393 B2 * | 1/2007 | Betta et al. | | 60/286 |
| 7,210,468 B1 * | 5/2007 | Saele | | 60/605.2 |
| 7,210,469 B1 * | 5/2007 | Saele | | 60/605.2 |
| 7,296,400 B2 * | 11/2007 | Nakada | | 60/278 |
| 7,296,403 B2 * | 11/2007 | Goebelbecker | | 60/278 |
| 7,454,911 B2 * | 11/2008 | Tafas | | 60/618 |
| 7,481,040 B2 * | 1/2009 | Lutz | | 60/278 |
| 7,530,221 B2 * | 5/2009 | Winsor | | 60/286 |
| 7,594,391 B2 * | 9/2009 | I et al. | | 60/285 |
| 7,681,560 B2 * | 3/2010 | Yamaoka et al. | | 123/568.11 |
| 2007/0089716 A1 * | 4/2007 | Saele | | 60/605.2 |
| 2007/0089717 A1 * | 4/2007 | Saele | | 60/605.2 |
| 2008/0178853 A1 * | 7/2008 | Yamaoka et al. | | 123/568.11 |
| 2009/0056314 A1 * | 3/2009 | Gabe et al. | | 60/278 |
| 2010/0050634 A1 * | 3/2010 | Yager | | 60/605.2 |

FOREIGN PATENT DOCUMENTS

| | | | |
|---|---|---|---|
| DE | 4240239 A1 | | 6/1994 |
| DE | 10130633 A1 * | | 1/2003 |
| JP | 54113722 A * | | 9/1979 |
| JP | 4279719 A | | 10/1992 |
| JP | 5321697 | | 12/1993 |
| JP | 06033707 A * | | 2/1994 |
| JP | 20366902 | | 10/1998 |
| JP | 11336610 | | 12/1999 |
| JP | 2000045881 | | 2/2000 |
| JP | 2000249003 A * | | 9/2000 |
| JP | 200045881 | | 8/2001 |
| JP | 2001295643 | | 10/2001 |
| JP | 2002180825 A | | 6/2002 |
| JP | 2002195106 A | | 7/2002 |
| JP | 2005048733 A * | | 2/2005 |
| JP | 2005127137 A | | 5/2005 |
| JP | 2005150653 A * | | 6/2005 |
| JP | 2005248777 A * | | 9/2005 |
| JP | 2007315231 A * | | 12/2007 |
| JP | 2008274790 A * | | 11/2008 |
| WO | 0077353 A2 * | | 12/2000 |

OTHER PUBLICATIONS

English Machine Translation of JP 2000-045881 A, published on Feb. 15, 2000.*

English Machine Translation of JP 10-266902 A, published on Oct. 6, 1998.*

English Machine Translation of JP 2001-295643 A, published on Oct. 26, 2001.*

English Machine Translation of JP 2002-180825 A, published on Jun. 26, 2002.*

English Machine Translation of JP 11-336610 A, published on Dec. 7, 1999.*

English Machine Translation of JP 05-321697 A, published on Dec. 7, 1993.*

Japanese Official Action in corresponding JP 2007-519165, dated on May 10, 2010.

European Search Report for corresponding European Application 05 755 059.2, Dated on Apr. 30, 2009.

International Search Report from corresponding International Application PCT/SE2005/001036, having the date of completion on Aug. 19, 2005.

* cited by examiner

INTERNAL COMBUSTION ENGINE EXHAUST GAS SYSTEM

BACKGROUND AND SUMMARY

The invention relates to an internal combustion engine exhaust gas system.

Present and future emission legislation on vehicle exhaust gas emissions sets considerable requirements on converting e.g., nitrogen oxides (NOx), hydrocarbons (HC), carbon monoxide (CO) and particulates into less hazardous compounds.

Exhaust gas aftertreatment systems generally involves a catalytic converter that needs to operate within a certain temperature interval. If the temperature is too high the converter may be deactivated or even destroyed, and if the temperature is too low the reaction rate of the desired catalytic reactions is too low. Below the so-called light-off temperature of the catalyst the reaction rate is close to zero.

Various catalytic systems exist for e.g., oxidation of HC and CO, for regeneration of particulate filters, and for reduction of NOx. An example of the latter is selective catalytic reduction (SCR) where urea/ammonia or HC is used to reduce NOx into nitrogen. In such a system urea or hydrocarbon is injected into the exhaust by an injector and the NOx is reduced to nitrogen over the catalyst. Another example is lean NOx adsorber/trap (LNA, LNT) where NOx is trapped in an adsorber during normal lean operation and reduced to nitrogen during short periods of rich operation of the engine.

In certain modes of operation, such as low load situations, and in certain applications, such as the use of a turbo system in connection to a diesel engine, the temperature of the exhaust gas has a tendency to fall below the suitable temperature interval of the converter. This results in a decreased conversion of the hazardous compounds. In order to solve the problem with low-temperature exhaust gas, large efforts have been made on developing catalysts with lower light-off temperatures. A general difficulty in this regard is that a lower light-off temperature normally gives a lower deactivation temperature. Another approach has been to focus on the location of the catalytic converter; e.g., to place the converter very close to the engine. Problems associated with this approach are increased risk of thermal deactivation and constraints in the freedom of placing the converter. Still another approach has been to modify the combustion so as to keep up the exhaust gas temperature. A general drawback with this approach is that it results in an increased fuel consumption.

The invention concerns an internal combustion engine exhaust gas system, comprising an EGR arrangement adapted to lead a first flow of exhaust gas (the EGR flow) from an outlet side of the engine to an inlet side of the engine, an exhaust gas conduit adapted to lead away a second flow of exhaust gas (the exhaust flow) from the outlet side of the engine, and an energy recovering unit, such as a turbo, associated with the exhaust gas conduit, the unit being adapted to recover exhaust gas energy from the exhaust flow. The invention is characterized in that the system comprises a heat exchanger adapted to allow heat exchange between at least a part of the EGR flow and at least a part of the exhaust flow, the heat exchanger being associated with the exhaust gas conduit at a position downstream the energy recovering unit.

The use of an energy recovering unit, such as a turbo, results in a temperature decrease of the exhaust gas, i.e. the temperature of the exhaust flow downstream the energy recovering unit will be lower than the temperature of the EGR flow. By providing the system with a heat exchanger this temperature difference can be utilized by transferring heat from the EGR flow to the exhaust flow. An advantageous effect of the characterizing feature is thus that the temperature of the exhaust gas can be increased in order to enhance the efficiency of the exhaust gas aftertreatment. For instance, if the temperature of the exhaust gas is below the suitable temperature interval of a catalytic converter the present invention makes it possible to increase the exhaust gas temperature to above the lower limit of the suitable interval. A further advantageous effect of the present invention is that the heat exchanger at the same time works as an EGR cooler. In many applications the EGR flow needs to be cooled in order to reduce the amounts of NOx produced during combustion. This is conventionally done in a separate EGR cooling unit. Thus, the present invention reduces the need for such separate cooling units.

BRIEF DESCRIPTION OF THE DRAWINGS

The invention will now be described in more detail with reference to the following drawing(s) where.

DETAILED DESCRIPTION OF THE INVENTION

Figure 1:
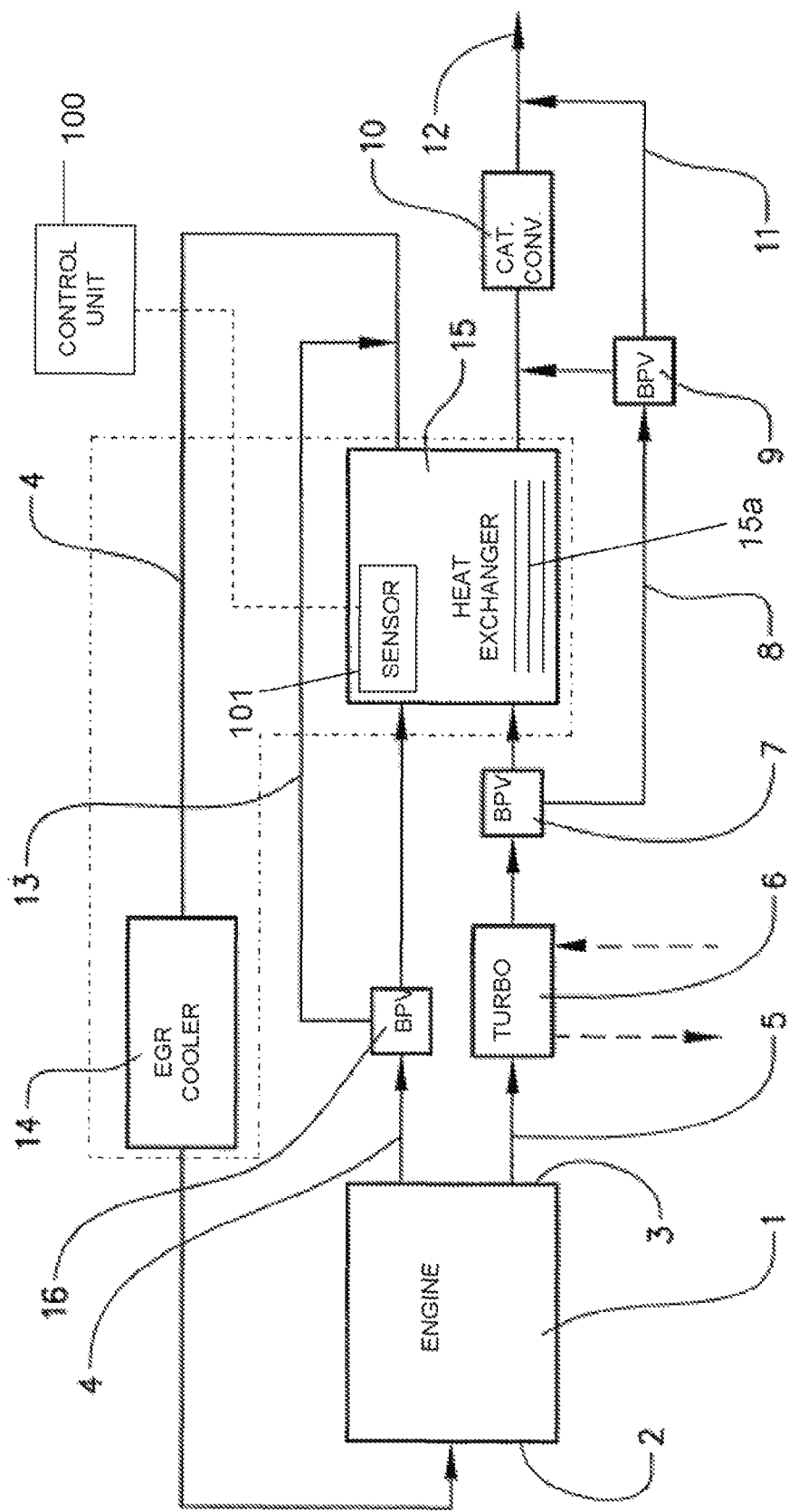
FIG. 1 schematically shows a first advantageous embodiment of the invention.

FIG. 1 shows schematically a first advantageous embodiment of the invention. Exhaust gas leaves an internal combustion engine 1 from an outlet side 3 of the engine 1. An EGR (exhaust gas recirculation) conduit 4 leads the EGR flow to a heat exchanger 15 and further, via an EGR cooler 14, back to an inlet side 2 of the engine. The system is provided with an EGR by-pass valve 16 and an EGR by-pass conduit 13 which are adapted to allow at least a part of the EGR flow to by-pass the heat exchanger 15. An exhaust conduit 5 leads the exhaust flow to a turbo 6 comprising an exhaust gas turbine where the energy of the exhaust flow is used to compress air (dashed arrows) that may be led to an air intake of the engine (not shown). From the turbo 6 the exhaust flow is further led by the exhaust conduit 5 via the heat exchanger 15 and a catalytic converter 10 to the end 12 of the exhaust conduit 5. At this end point 12 the exhaust flow may be released to the atmosphere. The system is provided with a first exhaust by-pass valve 7 and a second exhaust gas conduit 8 adapted to allow at least a part of the exhaust flow to by-pass the heat exchanger 15. Further, the system is provided with a second exhaust by-pass valve 9 and a third exhaust gas conduit 11 which are adapted to allow at least part of the exhaust flow to by-pass the catalytic converter 10.

When the EGR flow and the exhaust flow leave the engine 1 they have similar temperature. As the exhaust flow passes the turbo 6 its temperature will decrease so that when the two flows enter the heat exchanger 15 the EGR flow will be warmer. As the two flows pass the heat exchanger 15 the temperature of the exhaust flow will increase whereas the temperature of the EGR flow will decrease.

The heat exchanger 15 is preferably arranged to allow a counter-current heat exchange process in order to improve heat exchange efficiency. Further, the heat exchanger 15 should be designed to withstand high temperatures and high pressures that in particular occur on the EGR side.

The catalytic converter 10 may be of a conventional type.

Preferably the surfaces 15a, of the heat exchanger 15 that come into contact with the exhaust flow are coated with a catalytic material that is adapted to convert hazardous compounds in the exhaust flow. Thereby the heat exchanger 15 can operate both as a heat exchanger and a catalytic converter. With a sufficient conversion efficiency of the heat exchanger 15 it is possible to eliminate the catalytic converter 10 which makes the system simpler, less expensive and more efficient as the pressure drop over the system may be decreased.

The heat exchanger 15 may operate as a catalytic converter for any type of exhaust gas aftertreatment techniques, such as NOx-reduction (e.g., LNC, LNT and SCR), particulate filtration and/or catalytic oxidation. The surfaces of the heat exchanger 15 will have a high temperature during operation of the engine and will therefore be very suitable for being coated with catalytic material.

Preferably also the surfaces of the heat exchanger 15 that comes into contact with the EGR flow are coated with a catalytic material that is adapted to convert certain compounds in the EGR flow. For instance, the catalytic material could include oxidation catalysts in order to oxidize HC, CO and at least part of the particulates. Thereby it would be possible to avoid or at least decrease soot contamination of the downstream EGR arrangement (e.g., conduit 4 and cooler 14) and the intake side 2 of the engine 1.

The EGR-part of the heat exchanger 15 could include particulate filter. The EGR flow is cooled in the heat exchanger 15. To be able to further cool the EGR flow, e.g., in high load situations, the system shown in the example in FIG. 1 also comprises the EGR cooler 14.

As illustrated in FIG. 1, the EGR cooler 14 may form a separate unit in the EGR arrangement. Alternatively or in addition to a separate EGR cooler, an EGR cooler may be integrated with the heat exchanger 15. In this case, the heat exchanger 15 will as described above transfer heat from the EGR flow to the exhaust flow. The integrated EGR cooler will instead be arranged to use a cooling medium for further cooling of the EGR flow. The cooling medium could be a gaseous or a liquid medium, e.g., water, preferably being contained in a separate medium loop. Optionally, the EGR cooler maybe of a gas/gas exchanger type using surrounding air as cooling medium. Regardless of whether the EGR cooler 14 is separate or integral with the heat exchanger, it may preferably be arranged downstream of the heat exchanger 15. A separate EGR cooler may advantageously be arranged to use a cooling medium as described above in relation to an integrated EGR cooler.

It should be noted that the additional EGR cooler 14 is not necessary for the invention. However, in most applications an additional cooling of the EGR flow is probably necessary for practical reasons. The more efficient design of the inventive heat exchanger 15 the lesser the need for additional EGR cooling. A further advantage of the present invention is that the damages common to conventional EGR coolers will be decreased due to the pre-cooling of the EGR flow in the heat exchanger 15 that lowers the temperature of the EGR flow that enters the additional EGR cooler 14.

EGR cooling is an increasingly important issue since future emission legislation will set further demands on large EGR flows to reduce the amounts of NOx which in turn set further demands on EGR cooling. The larger the EGR coolers the larger the problems with engine system efficiency and physical placing of the coolers. The present invention reduces problems related to EGR-cooling.

In order to optimize the system, e.g., by minimizing losses of heat and avoid deactivation of the catalytic material, the system preferably is provided with a control system comprising a control unit 100, sensors 101 that provide the control unit with relevant information and controllable valves to control the by-pass flows. Examples of suitable sensors are temperature sensors located inside the heat exchanger 15 where the catalytic reactions take place and located upstream the heat exchanger to determine the temperature of the incoming exhaust and EGR gas flows. Temperature sensors may also be placed inside and upstream the catalytic converter 10 if such a converter is used. In addition, one may include control of the EGR cooler 14. Preferably, the control system further comprises flow sensors and sensors for determination of e.g., NOx, HC and NH3.

Such a control system can be used to adapt the exhaust gas system to different situations. For example, if the concentration of hazardous compounds in the exhaust gas is low and the exhaust gas temperature is lower than that of the heat exchanger 15, such as in low-load situations, one may bypass the exhaust flow via the second and third exhaust conduits 8, 11 to avoid cooling of the heat exchanger 15. Bypassing the exhaust flow is also advantageous in certain situations where the exhaust gas temperature is so high (above around 5500 C) that it might deactivate or damage the catalytic material in the heat exchanger 15. Bypass of the EGR flow via the EGR by-pass conduit 13 is advantageous in situations where the EGR flow temperature is lower than the temperature of the heat exchanger (to avoid cooling) and where the temperature of the EGR flow is too high (to avoid damage/deactivation of the catalytic material).

In cold-start situations it is important to heat up the catalytic system as fast as possible. By using an additional catalytic converter (not shown) that has a lower thermal mass than the heat exchanger 15, and that for this reason can be more rapidly heated up, the control system can be used to bypass the heat exchanger 15 during cold start and lead the exhaust flow through this additional converter to achieve an efficient conversion more rapidly. The additional converter may be associated with the third exhaust conduit 11 or with an additional exhaust conduit (not shown).

Preferably, the system is further provided with adsorption/desorption agents applied to at least a part of the surfaces that are in contact with the exhaust flow upstream the heat exchanger 15. as an example, a separate adsorption/desorption unit could be positioned between the energy recovering unit 6 and the heat exchanger 15. The agents preferably adsorb hydrocarbons and/or nitrogen oxides at, or below, a first temperature and releases them at, or above, a second temperature which is higher than the first temperature. During cold-start, and perhaps also in certain low-temperature operation modes, hydrocarbons and/or nitrogen oxides will thus be adsorbed by the agents. As the temperature increases the adsorbed compounds desorb and follow the exhaust flow. Generally, the temperature at which species desorb from such agent is lower than the light-off temperature of a catalyst. In a conventional exhaust gas system the compounds will only reach colder regions on their way out of the system and will thus leave the system non-converted. However, because i) the desorption occurs upstream the heat exchanger 15, ii) the heat exchanger 15 can operate as a catalytic converter, and iii) the heat exchanger 15 can be heated up by the EGR, the desorbed compounds in the present invention will reach a region with a higher temperature, the heat exchanger 15, on their way out of the system. This way it is possible achieve an efficient conversion also in a cold-start situation.

Similar to the exhaust side described above, adsorption/desorption agents can also be applied on the EGR side upstream the heat exchanger 15.

The energy-recovering unit is in FIG. 1 exemplified with a turbo 6. Accordingly, FIG. 1 shows an example of a turbo charged engine. Principally, a turbo comprises two turbine wheels attached to a common shaft where one of the wheels is driven by the exhaust flow and the other compresses air. To increase the turbo power the turbo 6 could be of a two-stage type where two turbos are serially connected and where the first turbo is optimized to work with a higher pressure and the second turbo is optimized to work with a lower pressure. Other types of turbos are also possible to use. A two-stage turbo may decrease the exhaust gas temperature around 30-80° C. further compared to a one-step turbo.

The invention is particularly useful in applications where the EGR flow is large, such as in an HHEGR-engine (High High EGR), and where the power of the energy-recovering unit 6 is large, such as when a two-stage turbo is used. In such applications large amounts of heat energy can be transferred from the EGR flow to the exhaust flow, and both the use of a large EGR flow and a high-power energy recovering unit 6 results in a considerable decrease of the exhaust gas temperature. HHEGR-engines are of interest to meet future regulations on NOx-emissions but has a general disadvantage of increased fuel consumption. In combination with a two-stage turbo this disadvantage becomes less important but then there is a problem associated with the low exhaust gas temperature. This may, however, be satisfactorily solved by applying the present invention.

As an alternative to a turbo the energy recovering unit 6 could still make use of an exhaust gas turbine but instead of compressing intake air the rotational movement could be used to e.g., compress oil to a hydraulic system, to produce electrical energy in a generator or to drive an output shaft. Further, the energy-recovering unit may comprise a thermo-electric material or arrangement adapted to convert thermal energy in the exhaust gas flow into electric energy. This could be used as an alternative to, or in combination with, the exhaust gas turbine.

The invention is not limited to the embodiments described above, but a number of modifications are possible within the frame of the following claims. For instance, FIG. 1 gives only a schematic outline of the invention. Of course, it is possible to use bypass conduits and valves in various ways. An example of a useful modification is to allow bypass of the catalytic converter 10 for an exhaust flow coming from the heat exchanger 15.

Further, the system may be modified in such a way that the EGR flow and the exhaust flow leaving the engine 1 have different temperatures, for instance by taking the EGR flow from one or several particular cylinders. The invention is applicable also for such modified systems.

The invention claimed is:

1. A heat exchanger, comprising heat exchange surfaces arranged to allow heat exchange between a first, EGR flow of exhaust gas that flows from an outlet side of an internal combustion engine to an inlet side of the engine, and a second, exhaust flow of exhaust gas that flows from the outlet side of the engine so that the heat exchanger functions as an EGR cooler, wherein the EGR flow and the exhaust flow flow through first and second conduits through the heat exchanger, respectively, the first and second conduits having separate inlets into the heat exchanger.

2. The heat exchanger according to claim 1, wherein at least a part of the surfaces in the heat exchanger that come into contact with the exhaust flow is coated with catalytic material adapted to convert hazardous compounds in the exhaust flow.

3. The heat exchanger according to claim 1, wherein at least a part of the surfaces in the heat exchanger that come into contact with the EGR flow is coated with catalytic material adapted to convert compounds in the EGR flow.

4. The heat exchanger according to claim 1, the EGR cooler being arranged to use a cooling medium.

5. The heat exchanger arrangement comprising a heat exchanger as set forth in claim 1, an energy recovery unit adapted to be in flow communication with the outlet side of the engine, an exhaust flow conduit attached at one end to the energy recovery unit and at an opposite end to the second conduit, and an EGR conduit attached at one end to the first conduit and adapted to be connected at an opposite end to the outlet side of the engine.

6. An exhaust gas system in an internal combustion engine exhaust gas system, comprising
an EGR arrangement adapted to lead a first, EGR flow of exhaust gas from an outlet side of the engine to an inlet side of the engine,
an exhaust gas conduit adapted to lead away a second, exhaust flow of exhaust gas from the outlet side of the engine,
an energy recovering unit associated with the exhaust gas conduit, the unit being adapted to recover exhaust gas energy from the exhaust flow, and
a heat exchanger adapted to allow heat exchange between at least a part of the EGR flow and at least a part of the exhaust flow, the heat exchanger being associated with the exhaust gas conduit at a position downstream of the energy recovering unit, so that temperature of the exhaust flow downstream of the energy recovering unit is lower than the temperature of the EGR flow and the heat exchanger is provided as an EGR cooler.

7. The system according to claim 6, wherein at least a part of surfaces in the heat exchanger that come into contact with the exhaust flow is coated with catalytic material adapted to convert hazardous compounds in the exhaust flow.

8. The system according to claim 6, wherein at least a part of surfaces in the heat exchanger that come into contact with the EGR flow is coated with catalytic material adapted to convert compounds in the EGR flow.

9. The system according to claim 6, wherein at least a part of surfaces that come into contact with the exhaust flow upstream of the heat exchanger is provided with adsorption/desorption agents.

10. The system according to claim 6, wherein at least a part of surfaces that come into contact with the EGR flow upstream of the heat exchanger is provided with adsorption/desorption agents.

11. The system according to claim 6, wherein the system comprises an EGR by-pass valve and an EGR by-pass conduit the EGR by-pass valve and EGR by-pass conduit being adapted to allow at least a part of the EGR flow to by-pass the heat exchanger.

12. The system according to claim 6, wherein the system comprises a first exhaust by-pass valve and a second exhaust gas conduit adapted to allow at least a part of the exhaust flow to by-pass the heat exchanger.

13. The system according to claim 6, wherein the system comprises a catalytic converter that is adapted to convert hazardous compounds in the exhaust flow.

14. The system according to claim 13, wherein the system comprises a second exhaust by-pass valve and a third exhaust gas conduit adapted to allow at least part of the exhaust flow to by-pass the catalytic converter.

15. The system according to claim 13, wherein the system comprises exhaust conduits and exhaust by-pass valves arranged to allow the exhaust flow to by-pass at least one of a heat exchanger and the catalytic converter.

16. The system according to claim 15, wherein the system comprises a control system adapted to control at least one of the by-pass valves.

17. The system according to claim 6, wherein the energy recovering unit comprises at least one turbine adapted to be driven by the exhaust flow.

18. The system according to claim 6, wherein the energy recovering unit comprises a thermo-electric material adapted to convert thermal energy in the exhaust gas flow into electric energy.

19. The system according to claim 6, wherein the internal combustion engine is a diesel engine.

20. The system according to claim 6, wherein the EGR arrangement comprises an EGR cooler.

21. The system according to claim 20, wherein the heat exchanger forms at least part of the EGR cooler.

* * * * *